United States Patent [19]
Ellis

[11] 3,955,650
[45] May 11, 1976

[54] AERODYNAMICALLY VENTILATED DISC BRAKE

[76] Inventor: Max H. Ellis, 1422 Washington St., Montebello, Calif. 90640

[22] Filed: Jan. 31, 1975

[21] Appl. No.: 546,190

[52] U.S. Cl. .............................. 188/71.1; 188/18 A; 188/73.3; 188/218 XL
[51] Int. Cl.² ........................................ F16D 65/12
[58] Field of Search ................. 188/71.1, 72.4, 72.5, 188/18 A, 218 XL, 264 A, 264 AA, 73.3; 192/113 A

[56] References Cited
UNITED STATES PATENTS

| 2,184,506 | 12/1939 | Eason | 192/113 A |
|---|---|---|---|
| 2,255,024 | 9/1941 | Eksergian | 192/113 A |
| 2,550,111 | 4/1951 | Else | 188/264 A |
| 2,936,035 | 5/1960 | Hill | 188/72.4 |
| 3,171,527 | 3/1965 | Ott | 188/264 A |
| 3,465,853 | 9/1969 | Zabalbeitia | 188/18 A |

FOREIGN PATENTS OR APPLICATIONS

| 34,348 | 4/1970 | Japan | 188/218 XL |
|---|---|---|---|
| 436,870 | 11/1967 | Switzerland | 188/264 A |
| 1,095,832 | 6/1955 | France | 188/72.5 |
| 1,024,375 | 2/1958 | Germany | 188/71.1 |
| 1,327,341 | 4/1963 | France | 188/71.1 |
| 1,106,416 | 3/1968 | United Kingdom | 188/264 A |

*Primary Examiner*—Trygve M. Blix
*Assistant Examiner*—Edward R. Kazenske

[57] ABSTRACT

A disc brake for operation on the pinion shaft of a motor vehicle has a disc assembly consisting of two parallel discs spaced from each other by a pattern of ribs. Spaces between the ribs provide ventilating passages into which air enters and circulates through the disc and ports extending through the discs on the forward and rearward sides. The disc assembly is keyed to the pinion gear shaft and bolted to the yoke of the shaft in driving relationship with the pinion shaft thereby to rotate with the driving component. A bracket bolted to the differential housing supports friction surfaced braking elements on opposite faces of the disc assembly and a remotely controlled hydraulic actuated piston provides the force which draws the braking elements into engagement with the disc assembly.

11 Claims, 8 Drawing Figures

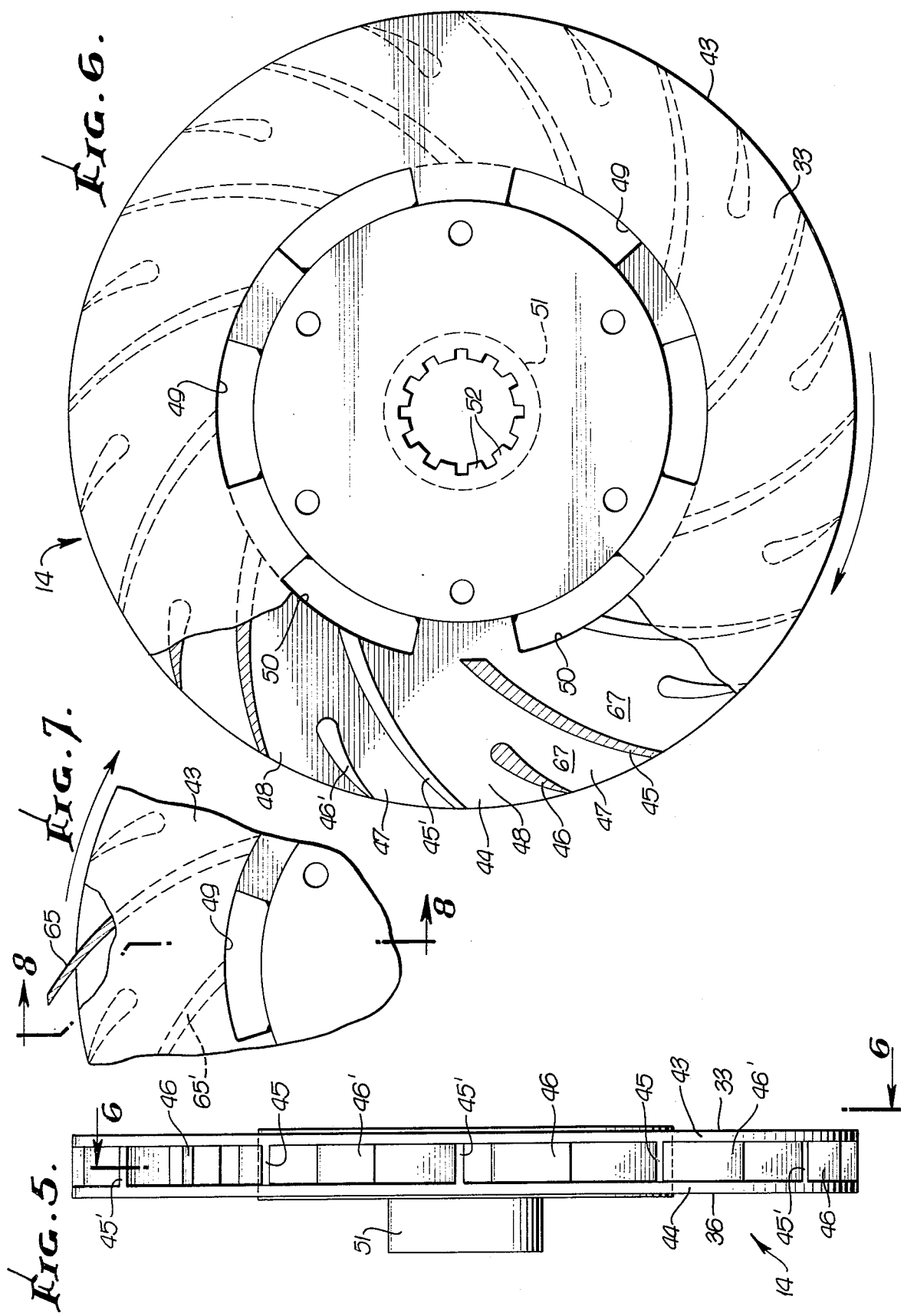

AERODYNAMICALLY VENTILATED DISC BRAKE

The development of the disc brake has now reached a point where a very large proportion of commercially available passenger cars are now at least partially equipped with disc brakes. As a rule disc brakes are mounted on the front wheels and conventional drum brakes on the rear wheels of the vehicle. A parking brake, sometimes designated as an emergency brake, is customarily provided for vehicles having automatic transmissions. The more conventional hand manipulated emergency brake is still the secondary braking device made use of on most automobiles and trucks.

An expedient which has been resorted to with some success is a manually actuated and applied mechanical conventional disc brake on and adjacent to and attached to the vehicle transmission housing. At this location the brake is foreward of the universal joints and applies a counter torque to the main drive line and universal joint assemblies. This type of construction imposes severe unusual and frequently destructive forces upon the drive line assemblies. When this system is applied to vehicles in motion considerable chatter and tortional vibration is experienced. Due to the disadvantageous location, together with improper aerodynamic cooling, the system experiences fading to the point where braking becomes ineffective.

Conventional hydraulic displacement system brakes or retarders, whether water, oil, or fluid, are generally unacceptable except in special circumstances because of initial expense and high maintenance cost, together with excessive size, weight, and complexity.

Spring actuated emergency brake systems provide no means for progressive application. They depend upon the skill of the vehicle operator and utilize the same shoes and drums as the main system which may be already overheated and in a fade condition subject to initial application of the brakes. Consequently, what should be an emergency brake becomes a secondary brake which is virtually useless in a major type of emergency.

Restricted exhaust retardation systems which have some application are limited in use to retardation only. Continued use is accompanied by detrimental effects to engine, piston, and piston ring assemblies. The last mentioned system is in the neighborhood of three times higher than the level of full load full speed engine noise.

It is therefore among the objects of the invention to provide a new and improved auxiliary or emergency brake operable at will by the driver for vehicles such as automobiles, trucks, buses and towing vehicles.

Another object of the invention is to provide a new and improved emergency or auxiliary brake system capable of attachment between the differential housing and the pinion shaft whereby to apply a torque directly to the differential pinion gear shaft and thrust bearings thereby avoiding excessive strain, torsion and dynamic imbalance load application to the drive line assemblies.

Still another object of the invention is to provide a new and improved brake system of the disc brake type wherein the disc is in a plane substantially perpendicular to air flow and thermally responsive to the air flow.

Another object of the invention is to provide a new and improved disc type brake of such aerodynamic configuration as to greatly improve the circulation of cooling air around and through the parts.

A further object of the invention is to provide a new and improved disc brake operable directly on the pinion shaft and applicable entirely independently of other brakes of the vehicle.

Still further among the objects of the invention is to provide a new and improved disc brake system which is simple in its construction, direct and positive in its installation to the rear portion of the drive shaft assembly at its connection to the differential housing and which is simple, rugged, relatively inexpensive from the point of initial installation as well as being easy to maintain.

Objects of this invention of special merit are to provide a new and improved disc brake system for a vehicle normally employing a brake on each of the four or more wheels. An additional brake is used operating entirely independently of the wheel brakes and applicable directly to the pinion shaft and in that way to act either as a separate brake for emergency or parking purposes or acting jointly with the other four brakes to augment the braking effect.

With these and other objects in view, the invention consists of the construction, arrangement, and combination of the various parts of the device, whereby the objects contemplated are attained, as hereinafter set forth, pointed out in the appended claims and illustrated in the accompanying drawings. In the drawings:

FIG. 5 is an edge elevational view of the disc portion of the invention of FIGS. 3 and 6.

FIG. 6 is a transverse elevational view taken in the line 6—6 of FIG. 5.

FIG. 7 is a fragmentary elevational view partially broken away of a form of the invention modified with respect to the form of FIGS. 3 and 6.

Figure 1:
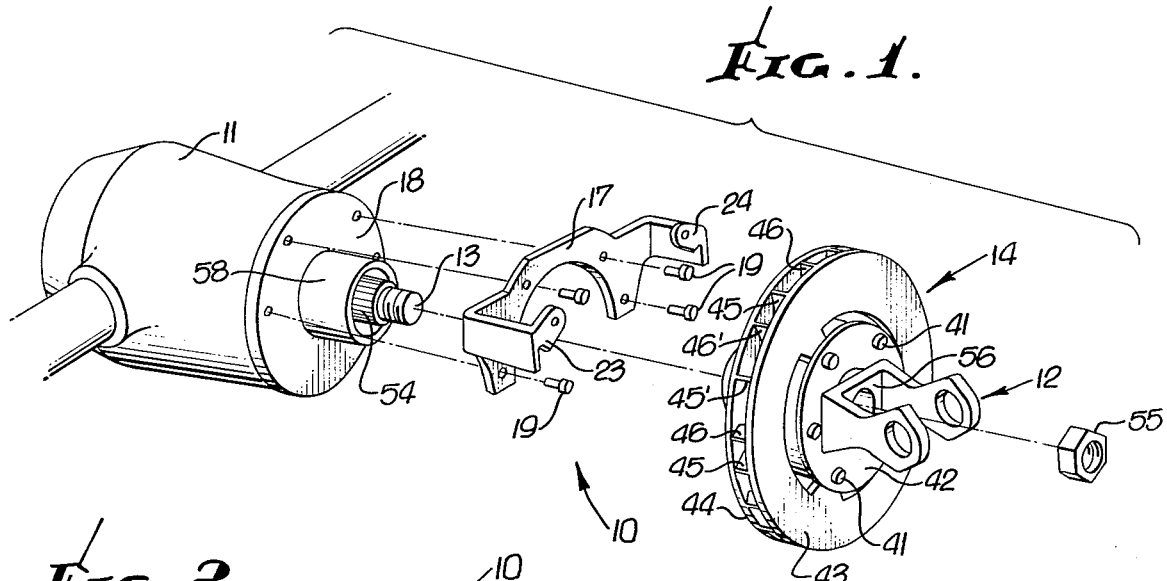
FIG. 1 is an exploded perspective view of the disc assembly and the parts of the drive shaft assembly to which it is connected.
Figure 2:
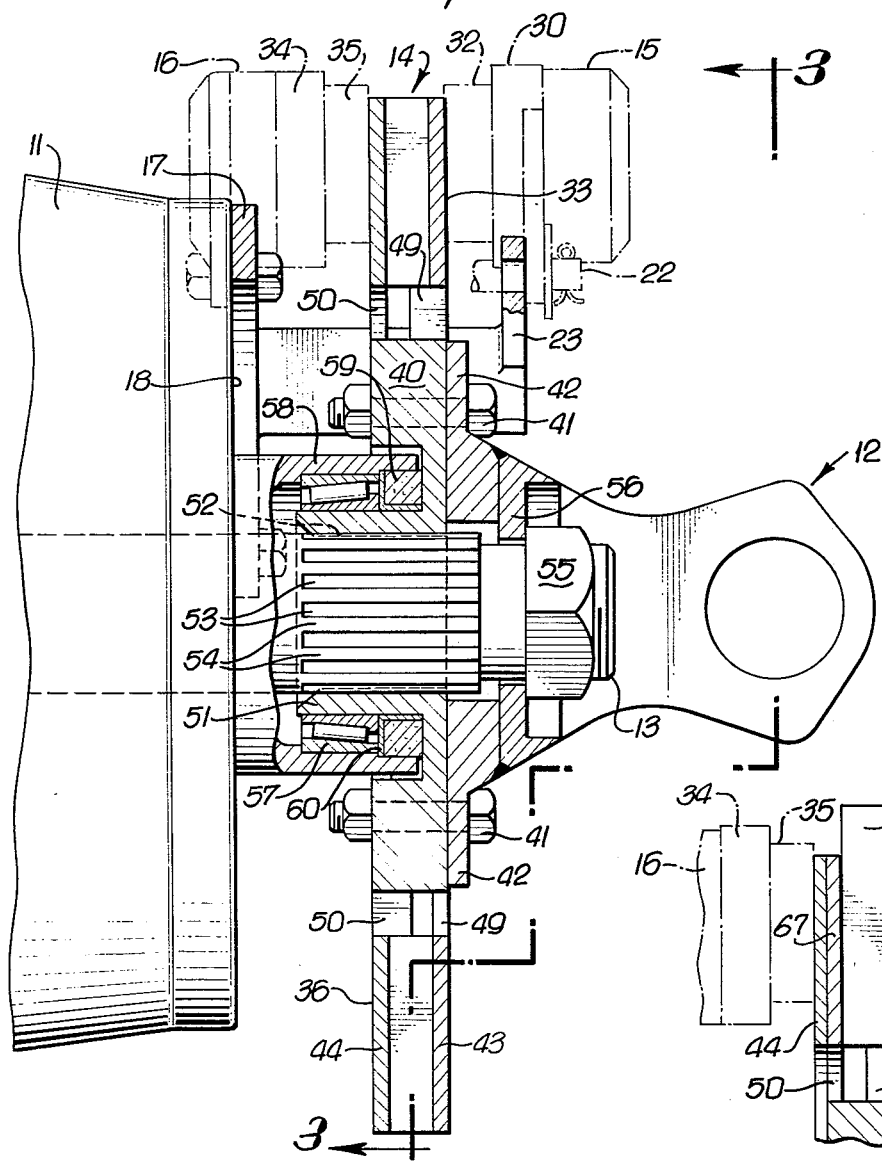
FIG. 2 is a longitudinal sectional view of the disc brake unit in place.

In an embodiment of the invention chosen for the purpose of illustration there is shown a disc brake unit indicated generally by the reference character 10, one portion of which is adapted to be secured to a differential housing 11 and the other portion of which is adapted to be secured to both a U joint yoke 12 and a differential pinion gear shaft 13. The U joint yoke 12 is attached in a conventional manner to a drive shaft (not shown). The disc brake unit consists in the main of a disc assembly 14 which rotates when the vehicle is in motion and a pair of calipers 15 and 16 which are fixed in position on the differential housing 11 and stationary relative to rotation of the disc assembly.

A bracket 17 is anchored to a face plate 18 of the differential housing 11 by means of studs 19. Links 20 and 21 are secured by pins 22 to respective lugs 23 and 24 of the bracket 17. The caliper 15 is attached to the links 20 and 21 on the forward side of the disc assembly 14 and the caliper 16 is similarly attached on the rearward side by means of bolts 25. Two piston housings 30 and 31 of the caliper 15 house pistons (not shown) to which is attached a friction pad 32, the friction pad being in a position adapted to frictionally engage a forward face 33 of the disc assembly 14. Similar piston housings 34 of the caliper 16 have attached to them a friction pad 35 which is adapted to engage a rearward face 36 of the disc assembly 14. The piston housings are adapted to be served by conventional hydraulic lines (not shown) available for manipulation by the driver in the vehicle.

The disc assembly 14 is carried by an annular plate 40 which is secured by bolts 41 to a flange 42 which is part of the U joint 12. Opposite spaced parallel discs 43 and 44 are spaced from each other by means of vanes 45, 45', and bosses 46, 46', the ribs and bosses serving as spacers and providing ventilating passageways 47 and 48. Forward ports 49 admit air which impinges upon the disc 43 on the forward side and ports 50 communicate between the passageways 47 and the rearward face 36 of the disc 44. The vanes 45 and bosses 46 are staggered relative to the vanes 45' and bosses 46' on the opposite disc for ease in fabrication. The bosses 46, 46' have arcuate opposite faces curved to create a knife edge at the outer end and a bulbous inner end.

A bushing 51 attached to the annular plate 40 in a position surrounding the differential pinion gear shaft 13 is provided with appropriate splines 52 with grooves therebetween adapted to engage respectively grooves 53 formed between splines 54 of the differential pinion gear shaft 13. In this way the disc assembly is in a second respect secured non-rotatably to the drive shaft assembly exemplified by the pinion gear shaft 13. A nut 55 overlying a base 56 of the U joint yoke 12 fastens the U joint yoke to the pinion gear shaft. A roller bearing 57 rotatably supports the exterior of the bushing 50 within a bearing sleeve 58 of the differential housing 11. A dust seal 59 is confined by an appropriate ring 60 forward to the roller bearing 57.

Figure 4:
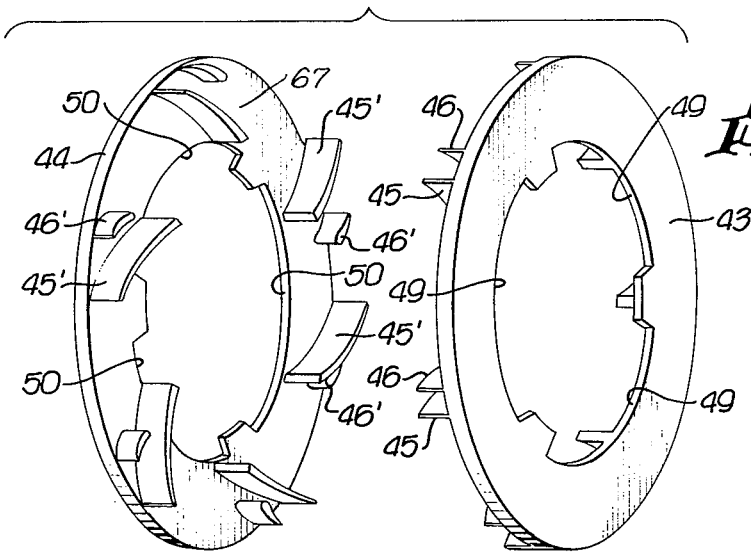
FIG. 4 is an exploded view in perspective of a modified form of disc assembly.
Figure 3:
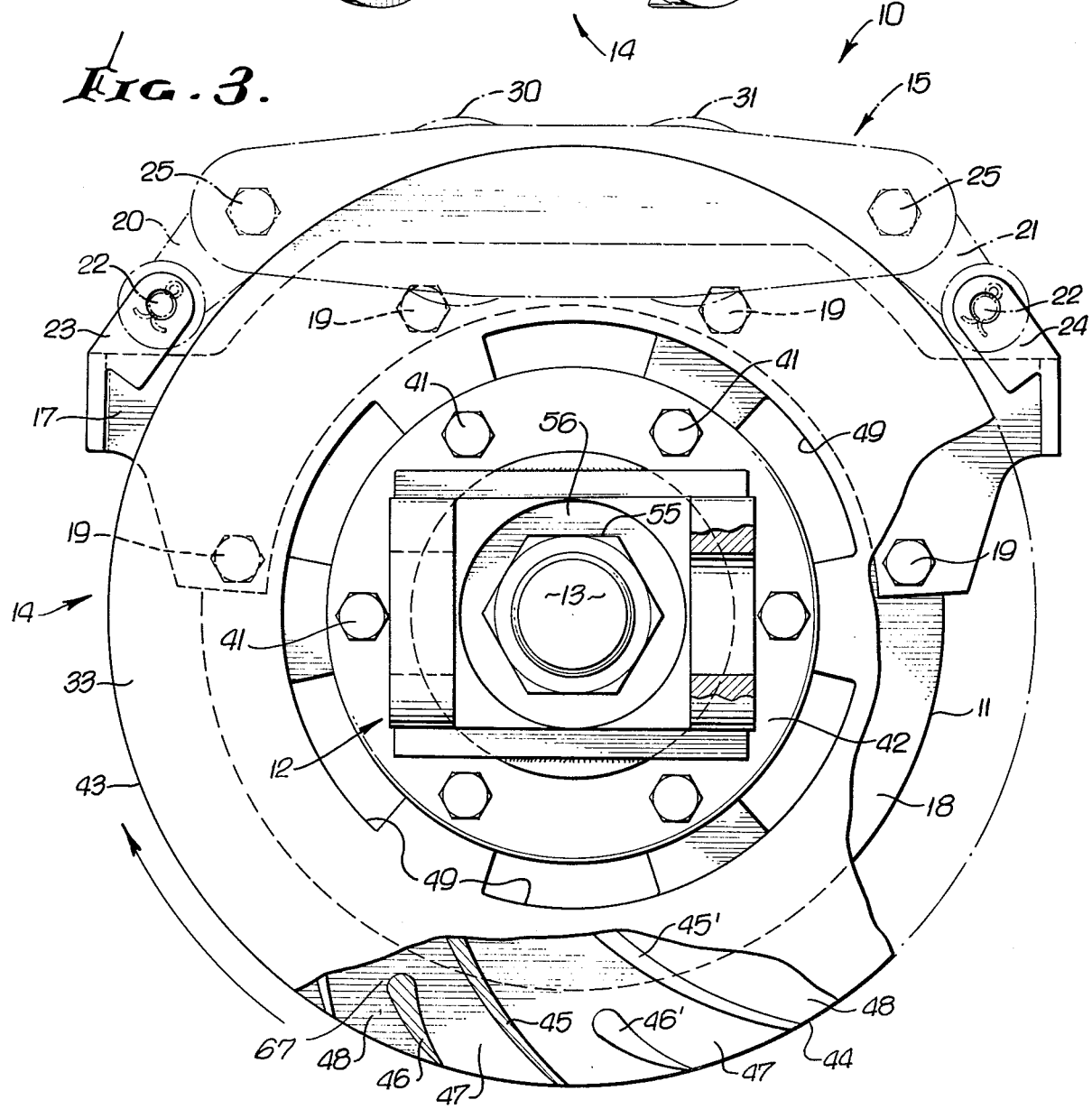
FIG. 3 is an end elevational view partially broken away taken on the line 3—3 of FIG. 2.

As shown in FIG. 4, vanes 45 and bosses 46 are carried by the forward disc 43 and vanes 45' with bosses 46' are carried by the rearward disc 44. Both the vanes and bosses and appropriately curved so that when the disc assembly is rotating with the flat side facing the front of the ports 49 catch the air and direct it inwardly through the passageways 47, 48 from which it emerges at the edge. Additionally air deflected laterally over the forward face of the disc produces a pressure drop at the edge as the outside air travels over and around the edge thus improving the discharge of air from the passageways. Should the disc be mounted on a wheel with the edge facing forward the direction of air flow through the disc would be reversed.

In operation the disc assembly 14 is rotating together with the pinion shaft assembly when the vehicle is in movement. When the disc brake is to be applied the hydraulic piston housings are activated causing the friction pads 32 and 35 to be pushed uniformly and simultaneously against opposite faces of the disc assembly thereby to apply frictional force to the disc brake unit on both sides and at spaced points. Rotation of the disc assembly 14 is by this means retarded and the retardation is transferred simultaneously to the differential pinion gear shaft 13 and the U joint yoke, in that way to impart a braking effect to the rear wheels of the vehicle through the differential. Because the disc assembly 14 is snuggly confined by the bushing 51 in rotatable engagement with the bearing sleeve 58 which is a stable portion of the differential housing the braking effect is direct, positive, and substantially without tendency to vibrate or chatter. Attachment of the disc assembly 14 directly to the U joint yoke 12 serves as an additional agency for minimizing chatter and vibration.

Figure 8:
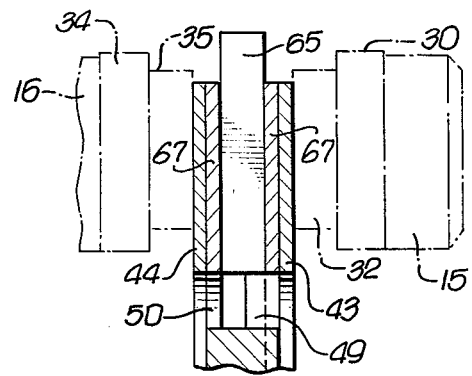
FIG. 8 is a fragmentary cross-sectional view taken in the line 8—8 of FIG. 7.

In the form of invention of FIGS. 7 and 8 tapered opposite faces of the vanes 65, 65' as the case may be extend radially outward relative to the perimeter of the disc assembly as shown in FIG. 7. Passages 48 direct its flow radially outwardly from the center of the disc assisted by a pressure drop at outer perimeter. Extended fins, like the fins 65, increase pressure drop as the air is heated by brake action. Expansion of the heated air further induces flow outwardly.

By having the vanes and bosses on both discs heat generated by brake action passes more uniformly by conduction to the interior where by convection it is carried off by the passage of cooling air. To further improve the heat transfer aluminum is used for the vane, a portion 67 of the aluminum being secured by conventional casting techniques to the inside faces of the discs 43 and 44 which are preferrably of iron. Iron, though less efficient than aluminum in the transfer of heat, presents a more resistant wear surface to the friction pads.

Having described this invention what is claimed as new in support of Letters Patent is as follows:

1. In a motor vehicle for travel in a selected direction equipped with a drive shaft assembly located parallel to the direction of travel and differential housing accommodating a pinion shaft of said drive shaft assembly, the combination of an aerodynamically and thermovolumetrically cooled central disc brake unit comprising a disc assembly having a non-rotatable attachment to the pinion shaft assembly and a braking member having a fixed attachment to the differential housing, said disc assembly comprising a pair of forward and aft spaced balanced parallel discs in a plane perpendicular to said direction of travel, each disc comprising a plurality of paired airfoil shaped vanes and spacers at uniformly circumferentially spaced locations, each paired vane and spacer on one disc being at locations alternating with each paired vane and spacer on the other disc, said airfoil shaped vanes and spacers being arcuate and extending from an inside end to an outside end obliquely rearwardly relative to a clockwise rotation of said drive shaft, said air foil shaped vane and spacers each being thicker at the inside end than at the outside end, the space between adjacent inside ends of said air foil shaped vanes being less than the space between adjacent outside ends of the same vanes whereby there are passageways in between adjacent vanes expanding progressively outwardly from an inside end to an outside end, the outside ends of said passageways being in unobstructed communication with the surrounding atmosphere, said spacers being located in said passageways, and a forward facing port on the forward disc in communication with the inside end of each said passageway.

2. A disc brake unit as in claim 1 wherein there is a bushing on the disc assembly having a keying attachment for engagement with said differential pinion gear shaft.

3. A disc brake unit as in claim 2 wherein there is an annular dust seal between the bushing and the differential housing.

4. A disc brake unit as in claim 1 wherein said ports extend through both discs between said passageways and the exterior.

5. A disc brake as in claim 1 wherein said spacers comprise bosses each having a length less than the length of the passageway and being located adjacent the outer ends of the passageways between adjacent vanes.

6. A disc brake unit as in claim 5 wherein there is a caliper on each opposite side of the transverse centerline and a pair of hydraulic cylinders for each caliper, oppositely facing cylinders of said pairs being in longitudinal alignment with each other.

7. A disc brake as in claim 1 wherein substantially half of the air foil shaped vanes and spacers are formed integrally with one of said discs and the rest of the airfoil shaped vanes and spacers are formed integrally with the other of said discs.

8. A disc brake as in claim 1 wherein protruding outer ends of the vanes extend radially outwardly beyond the circumferential edges of the disc assembly whereby to enhance the pressure drop at the perimeter.

9. A disc brake as in claim 8 wherein the protruding outer ends extend angularly rearwardly relative to the clockwise rotation of the disc assembly.

10. A disc brake unit as in claim 1 wherein the braking member comprises complementary friction faced calipers on opposite exterior faces of the discs, a bracket on the differential housing and links forming articulated connections between said calipers and the bracket.

11. An automatic disc brake system comprising
a differential unit including a stationary housing and a rear pinion shaft section in said housing having a splined outer end, a forward drive shaft section having a U joint yoke at the rearward end,
a disc brake unit comprising a disc assembly having connections respectively to said splined outer end and said forward drive shaft section,
said disc brake unit comprising a pair of forward and aft spaced and balanced parallel disc elements on an axis concentric with said forward drive shaft section,
each disc comprising a plurality of paired airfoil shaped vanes and spacers at uniformly circumferentially spaced locations, each paired vane and spacer on one disc being at locations alternating with each paired vane and spacer on the other disc, said airfoil shaped vanes and spacers being arcuate and extending from an inside end to an outside end obliquely rearwardly relative to a clockwise rotation of said drive shaft, said air foil shaped vanes and spacers each being thicker at the inside end than at the outside end, the space between adjacent inside ends of said air foil shaped vanes being less than the space between adjacent outside ends of the same vanes whereby there are passageways in between adjacent vanes expanding progressively outwardly from an inside end to an outside end, the outside ends of said passageways being in unobstructed communication with the surrounding atmosphere, said spacers being located in said passageways, and a forward facing port on the forward disc in communication with the inside end of each said passageway,
said passageways being open to said atmosphere at the circumference of the disc brake unit and in a direction transverse with respect thereto,
said disc elements having a splined engagement with said rear shaft section and a non-rotatable attachment to said forward shaft section,
and a brake actuating unit comprising a bracket on said differential housing,
a pair of complementary friction faced caliper elements mounted on said bracket in positions of engagement with respective opposite faces of said disc elements and complementary power units in operating engagement with respective friction faced caliper elements adapted when energized to exert braking action simultaneously against opposite faces of said disc elements.

* * * * *